Nov. 2, 1965    S. B. McMASTER ETAL    3,215,410
PLASTIC BEATER FOR FOOD AND DRINK MIXERS
Filed Jan. 9, 1961
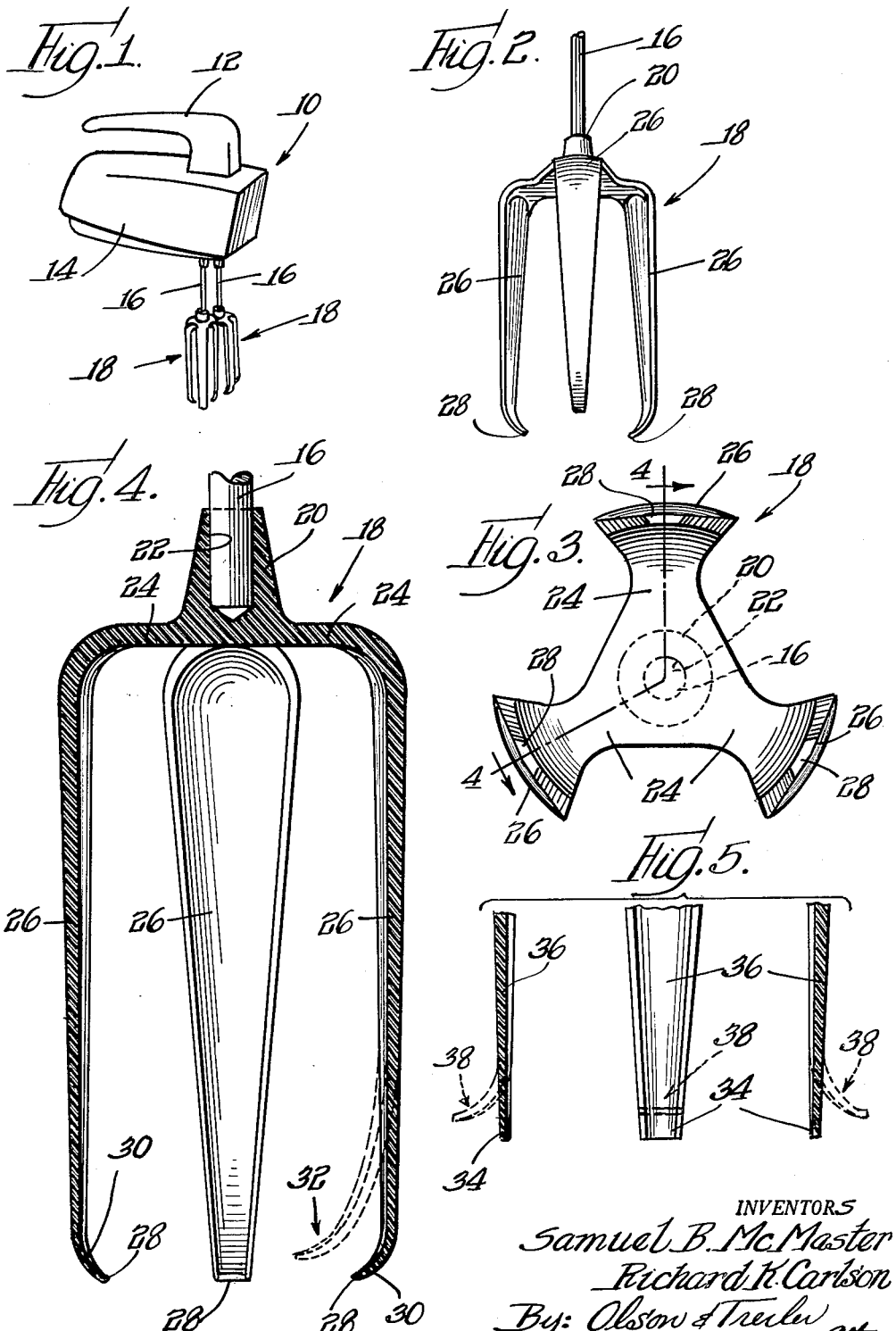
INVENTORS
Samuel B. McMaster
Richard K. Carlson
By: Olson & Trexler
Attys.

United States Patent Office 3,215,410
Patented Nov. 2, 1965

3,215,410
PLASTIC BEATER FOR FOOD AND
DRINK MIXERS
Samuel B. McMaster and Richard K. Carlson, Chicago,
Ill., assignors to G-M Laboratories Inc., Chicago, Ill.,
a corporation of Illinois
Filed Jan. 9, 1961, Ser. No. 81,412
7 Claims. (Cl. 259—131)

This invention relates generally to domestic, food and drink mixing apparatus and especially to the beaters employed in such apparatus.

Both electrically and manually operated, domestic, food and drink mixing apparatus commonly include rotatable shafts and beater elements. Ordinarily, each beater element is constructed with four beater blades joined at both the top and bottom to a rod that is adapted to be coupled to a rotatable shaft. Furthermore, the prior art beater elements are ordinarily constructed from chrome-plated steel.

Beater elements so constructed and arranged are notoriously difficult to clean because of the sharp corners, points and overlaps that are presented. Moreover, when these prior art beaters are used in conjunction with a glass or china vessel, mixing of the ingredients disposed near the sides and bottom of the vessel is frequently quite poor because of reticence on the part of the operator to allow the metal blades to clash against the walls of the mixing vessel. In addition, beater elements constructed from chrome-plated steel have proved expensive to manufacture. Furthermore, chrome-plated steel beaters, once bent or otherwise deformed, become virtually useless.

Accordingly, an important object of the present invention is to provide new and improved beaters for food and drink mixing apparatus.

Another object of the invention is to provide beaters of the type described which afford enhanced mixing.

Still another object of the invention is to provide beaters for food and drink mixers which facilitate scraping the sides and bottom of the mixing vessel.

Yet another object of the invention is to provide a beater for food and drink mixing apparatus that is easy to clean and inexpensive to manufacture.

A further object of the invention is to provide a beater for food and drink mixers that permits cushioned engagement with a mixing vessel.

A still further object of the invention is to provide domestic, food and drink mixing apparatus that is quiet in operation and that is safe to use.

Additional objects and features of the invention pertain to the particular structure, materials and arrangements whereby the above objects are attained.

A structure in accord with the invention includes a rotatable shaft and a unitary beater means permanently fixed to the shaft, including a hub having a bore for aggressively receiving an end of the shaft, a plurality of arms radiating from the hub, and flexible beater blades free at one end and fixed at the opposite end each to one of the arms.

The invention, both to its structure and mode of operation, will be better understood by reference to the following disclosure and drawing forming a part thereof, wherein:

FIG. 1 is a perspective view of an electric hand mixer incorporating beater elements constructed in accordance with the invention;

FIG. 2 is an enlarged, perspective view of a beater element used with the mixer of FIG. 1;

FIG. 3 is an enlarged, bottom plan view of the beater element of FIG. 2;

FIG. 4 is a further enlarged view taken through the section 4—4 of FIG. 3, the flexing of the tip of one blade being shown in broken outline; and FIG. 5 is a fragmentary view of a modified form of the invention, similar to the showing of FIG. 4 but illustrating only the tips of the blades and indicating the flexing of the blade tips in broken outline.

Referring now in detail to the drawing, specifically to FIG. 1, an electric hand mixer will be seen indicated generally by the numeral 10. The mixer 10 includes a handle 12, a housing 14, a pair of spaced output shafts 16 and a pair of beater elements 18, each beater element being joined to one of the shafts 16 to intermesh in a well known manner.

Housing 14 encloses an electric motor, suitable gearing and the other elements customarily incorporated in an electric hand mixer. However, since the elements encompassed by housing 14 comprise no part of the present invention, they are not illustrated in detail nor will they be described herein. It is to be pointed out that the present invention resides primarily in the beater elements 18; and it is to be further noted that the beater elements 18 may be equally usefully embodied in a manual mixer or in a base-mounted electric mixer.

Turning to FIGS. 2–4 inclusive, a beater element 18 will be seen to include a frusto-conical hub 20. A cylindrical bore 22 is formed in hub 20 opening from the smaller end of the hub to receive shaft 16. The bore 22 is selected to be of such a size relative to the shaft 16 that a press fit may be achieved whereby non-rotatably to secure the beater element to the shaft. Moreover, the shaft 16 is desirably knurled so that the beater element 18 can be permanently fixed to the shaft.

Radiating from the hub 20 is a suitable number of wedge-shaped arms 24, three arms being provided in the illustrated embodiment. A beater blade 26 is joined end-to-end to each of the arms 24, the blades 26 being equally arcuately spaced about the hub 20 in order to provide a balanced unit. Furthermore, the arms 26 are arranged to be flexible and are arranged to be progressively more flexible toward their tips 28. Each of the blades 26 gradually tapers both in cross section and peripheral extent from its connection with the respective arm 24 to its tip 28 in order to achieve this progressive flexibility.

In the embodiment of FIGS. 2–4, the free tips of blades 26 are formed inwardly on a generous radius 30. This curvature couples with the flexibility of the blades to permit intimate contact between the blades and the walls of the mixing vessel in which it is being used. Flexing of the blade, as upon its being urged against a wall of a mixing vessel is indicated at 32. To further faciliate intimate contact between the beater blades and the walls of a mixing vessel, the individual blades are advantageously fashioned with a transverse curvature, the outer surface of the blades 26 defining arcs of a circle concentric with shaft 16, as is indicated in FIG. 3, thus presenting along the transverse curvature of each blade chordal lengths greater than the radial thickness of each blade and of decreasing lengths toward the tip of each blade.

The hub 20, the arms 24 and the blades 26 are advantageously formed as a unitary beater element; and this objective is achieved as by molding the beater element from a suitable, resinous plastic material. The physical, mechanical and chemical properties of polyamide resins eminently fit these materials for use in fabricating the beater element 18; and the polymerized formaldehyde acetal resin available commercially under the trademark "Delrin" has proved particularly useful in this regard.

When the beater element 18 is fabricated from "Delrin," it has been found to resist stains and deformation in boiling water. Moreover, a good press fit with shaft 16 can be attained. More importantly, the desired flexibility of the blades 26, particularly at the tips 28 thereof, is readily achieved while, at the same time, the desired rigidity of the overall beater element is maintained so as to permit cantilevering of the individual blades from their respective arms 24 without developing a weak, easily deformed unit.

It is to be pointed out that the open nature of the bottom end of the beater element facilitates its cleaning after use, this cleaning being easily and efficiently achieved because the beater element 18 is arranged without sharp corners, joints or overlaps which would complicate the cleaning process. Since the beater element 18 is fabricated from a resinous plastic material, it will be recognized that its impact with a glass or china mixing vessel does not generate the noise customarily associated with metal beater elements. Furthermore, should a person's finger be accidentally inserted between the beater elements while they are rotating, no laceration or other injury will be incurred.

It is to be realized that the invention is not limited to the particular embodiment shown in FIGS. 1-4. For example, a modified form of the invention is indicated in FIG. 5. There the tips 34 of beater blades 36 are straight or are fashioned with an outward bending as shown at 38. Such an arrangement particularly facilitates the use of the beater element of the invention with hand-operated mixers since downward pressure applied to the mixer spreads the tips of the blades, offering a cushioned engagement between the mixer and the bottom of the mixing bowl.

Thus, it will become apparent that the present invention provides a highly useful beater element. The specific examples herein shown and described should, therefore, be considered as illustrative only. Various changes in structure may occur to those skilled in the art; and these changes are to be understood as forming a part of the present invention insofar as they fall within the spirit and scope of the appended claims.

The invention is claimed as follows:

1. A beater for food and drink mixers comprising a hub adapted to be fixed to an output shaft, and a plurality of flexible and resilient blades joined to said hub and spaced radially outwardly from the axis of rotation of said hub and then downwardly and without encompassing framework, and said blades being elongate relative to the said radial spacing and decreasing in width and cross section toward the lower ends thereof for increased flexibility and having free tips at the said lower ends thereof enabling the blades to generally conform and make wiping contact with interior surface portions of a mixing receptacle.

2. A beater as claimed in claim 1, wherein each blade has a cross section presenting a chordal length substantially greater than the radial thickness thereof for resisting skewing of the blades in use and presenting an edge for scraping interior surface portions of a mixing receptacle.

3. A beater as claimed in claim 2, wherein the chordal length decreases toward the tips of the blades.

4. A beater as claimed in claim 1, wherein each blade is of arcuate cross section.

5. A beater as claimed in claim 1, wherein the tips of the blades are normally curved radially inwardly.

6. A beater as claimed in claim 1, wherein the tips of the blades are normally straight.

7. In a domestic food and drink mixer apparatus, the cmbination of a rotatable shaft, a unitary beater including a hub for attachment to said shaft and a plurality of flexible and resilient blades joined to said hub and extending downwardly therefrom with substantially the maximum radial spacing of said blades from the axis of rotation of said hub being substantially radially outwardly from said hub, and said blades being elongate relative to the said radial spacing and decreasing in width and cross section toward the lower ends thereof for increased flexibility and having free tips at the said lower ends thereof enabling the blades to generally conform and make wiping contact with interior surface portions of a mixing receptacle.

References Cited by the Examiner

UNITED STATES PATENTS

| 203,407 | 4/78 | Howe | 259—131 |
| 282,047 | 7/83 | Bruck. | |
| 499,741 | 6/93 | Juergens | 259—131 |
| 1,014,382 | 1/12 | Forth | 259—131 X |
| 2,218,433 | 10/40 | Mullner | 259—84 |
| 2,502,571 | 4/50 | Jones | 259—131 |

FOREIGN PATENTS

| 563,369 | 9/58 | Canada. |
| 602,945 | 8/60 | Canada. |
| 4,970 | 1907 | Great Britain. |

WALTER A. SCHEEL, *Primary Examiner.*

J. S. SHANK, *Examiner.*